(12) United States Patent
Deckert

(10) Patent No.: US 11,434,035 B2
(45) Date of Patent: Sep. 6, 2022

(54) DEVICE FOR LABELLING CONTAINERS

(71) Applicant: KHS GmbH, Dortmund (DE)

(72) Inventor: Lutz Deckert, Haltern am See (DE)

(73) Assignee: KHS GmbH, Dortmund (DE)

( * ) Notice: Subject to any disclaimer, the term of this patent is extended or adjusted under 35 U.S.C. 154(b) by 244 days.

(21) Appl. No.: 16/634,982

(22) PCT Filed: Aug. 15, 2018

(86) PCT No.: PCT/EP2018/072121
§ 371 (c)(1),
(2) Date: Jan. 29, 2020

(87) PCT Pub. No.: WO2019/042776
PCT Pub. Date: Mar. 7, 2019

(65) Prior Publication Data
US 2020/0231319 A1    Jul. 23, 2020

(30) Foreign Application Priority Data
Aug. 30, 2017 (DE) .................. 10 2017 119 943.8

(51) Int. Cl.
| | |
|---|---|
| *B65C 9/00* | (2006.01) |
| *B65C 3/00* | (2006.01) |
| *B32B 38/00* | (2006.01) |
| *B65C 9/18* | (2006.01) |
| *B65C 3/16* | (2006.01) |

(Continued)

(52) U.S. Cl.
CPC .............. *B65C 9/1819* (2013.01); *B65C 3/16* (2013.01); *B65C 9/42* (2013.01); *B29C 2793/00* (2013.01); *B32B 38/0004* (2013.01); *B32B 38/04* (2013.01); *B65C 2009/1838* (2013.01); *Y10T 156/12* (2015.01)

(58) Field of Classification Search
CPC .......... B65C 9/1819; B65C 3/16; B65C 9/42; B65C 2009/1838; B29C 2793/00; B32B 38/0004; B32B 38/04; Y10T 156/12
See application file for complete search history.

(56) References Cited

U.S. PATENT DOCUMENTS

| 5,415,651 A | 5/1995 | Gorshe |
| 5,486,253 A | 1/1996 | Otruba |

(Continued)

FOREIGN PATENT DOCUMENTS

| DE | 69634708 | 1/2006 |
| DE | 102006017365 | 10/2007 |

(Continued)

OTHER PUBLICATIONS

English Machine Translation in espacenet of EP2837572—published Feb. 18, 2015 to Tobias, 12 pages. (Year: 2015).*

(Continued)

*Primary Examiner* — Linda L Gray
(74) *Attorney, Agent, or Firm* — Occhiuti & Rohlicek LLP

(57) ABSTRACT

A container-labeling apparatus includes a label-strip feeder having a vacuum drum and a vacuum cylinder that has vacuum regions extending between different angular ranges. A first vacuum source provides the vacuum at the vacuum drum and a second vacuum source provides the vacuum at the vacuum cylinder. During operation, the vacuum regions provide different under-pressures.

11 Claims, 5 Drawing Sheets

(51) Int. Cl.
  *B65C 9/42* (2006.01)
  *B32B 38/04* (2006.01)

(56) References Cited

U.S. PATENT DOCUMENTS

| | | | |
|---|---|---|---|
| 6,730,189 B1 * | 5/2004 | Franzmann | A61F 13/15756 156/519 |
| 2001/0017181 A1 * | 8/2001 | Otruba | B65C 9/1819 156/64 |
| 2008/0112790 A1 * | 5/2008 | Beyer | F04D 17/168 415/55.1 |
| 2012/0024470 A1 * | 2/2012 | Hundorf | A61F 13/15658 427/180 |

FOREIGN PATENT DOCUMENTS

| | | |
|---|---|---|
| DE | 102007009152 | 8/2008 |
| DE | 102007009484 | 8/2008 |
| DE | 102012216771 | 3/2014 |
| DE | 102013215998 | 3/2015 |
| DE | 102014105485 | 10/2015 |
| DE | 202015104167 | 12/2016 |
| EP | 2837572 | 2/2015 |
| EP | 2711303 | 3/2019 |
| WO | WO2017/032579 | 3/2019 |

OTHER PUBLICATIONS

Minivac, Side Channel Vacuum Pump, 2 pages, May 17, 2017: minivacpumps.com/side-channel-vacuum-pumps.html. (Year: 2017).*
Waybackmachine for "minivac, Side Channel Vacuum Pump, 2 pages, May 17, 2017: minivacpumps.com/side-channel-vacuum-pumps.html." showing publication date of May 17, 2017, 1 page. (Year: 2017).*

* cited by examiner

DEVICE FOR LABELLING CONTAINERS

RELATED APPLICATIONS

This application is the national stage of international application PCT/EP2018/072121, filed on Aug. 15, 2018, which claims the benefit of the Aug. 30, 2017 priority date of German application DE 10-2017-119-943.8, the contents of which are herein incorporated by reference.

FIELD OF INVENTION

The invention relates to a device for labeling containers.

BACKGROUND

A device for feeding labels typically feeds a continuous label strip made of individual labels that are cut from the label strip. In many cases, cylindrical transfer devices guide a portion of the label strip so that it traverses a sinuous path. These transfer devices often rely on a vacuum cylinder to hold the strip.

During operation, the transfer devices often rotate fast enough so that the speed at their circumferences is higher than the rate at which the strip is being fed. This results in slippage between the label strip and the transfer devices and high tensile forces on the strip. These high tensile forces tend to elongate the strip. This elongation can result in faults in labeling.

The extent of elongation depends on the vacuum force and friction. The vacuum must be strong enough to hold the label strip securely but not so strong as to cause excessive elongation.

In setting the vacuum force, it is also necessary to account for the mechanical properties of the strip, including its friction coefficient and modulus of elasticity. These properties change from batch to batch and from roll to roll. Thus, it is often necessary to adjust the vacuum force and to maintain it precisely over an extended period of time.

Known ways to adjust a vacuum force include the use of such fittings as valves, chokes, and flap valves. These operate by restricting the opening to increase the vacuum force and allowing ambient air into the vacuum line to reduce the force. However, it is difficult to adjust the force at one location without also adjusting it at another location.

SUMMARY

An object of the invention is that of providing a device for labelling containers that avoids the disadvantages referred to heretofore, that is simple in configuration, and, in particular, that allows for simple and reliable adjustment setting, as well as adjustment of the underpressure conditions to the transfer device.

In one aspect, the invention features a device for labelling containers, the device comprising a label strip feed and at least one vacuum drum unit, in which the label strip feed unit is designed to feed at least one label strip comprising multiple individual labels to the at least one vacuum drum unit, wherein the label strip feed comprises at least one first vacuum cylinder rotating about a cylinder vertical axis, on the outer lateral surface of which, at least over a part of the circumference, a partial length of the label strip comes to rest, and is held there under the action of a vacuum, and wherein the label strip feed unit comprises at least one cutting apparatus for separating the label strip into individual labels, wherein the at least one vacuum drum unit is designed to receive the individual labels provided from the first vacuum cylinder, to hold the received individual labels on the outer lateral surface of the vacuum drum unit, and to transport the labels in the conveying direction, in each case by the application of a vacuum, and wherein at least one first and second vacuum-generating apparatus are provided, wherein the first vacuum-generating apparatus is designed to provide a vacuum at least at the vacuum drum unit, and the second vacuum-generating apparatus is designed to provide a vacuum at least at the first vacuum cylinder. According to the invention, provision is made for the at least one vacuum cylinder to form at its rotating outer lateral surface, depending on the angle of rotation, a first vacuum region, as well as at least one second vacuum region separated from the first, and that the first vacuum region is configured so as to impose a first underpressure, and the second vacuum region is configured so as to impose a second underpressure which is different to the first underpressure.

In differentiation to the prior art, the device according to the invention for labelling provides not one single common vacuum distribution system, with only one single vacuum-generating apparatus, for both the at least one vacuum cylinder as well as for the vacuum drum, but divides this one vacuum distribution system into a plurality of, and at least two, independent vacuum systems, and proposes that at least one first and one second vacuum-generating apparatus are provided, wherein the first vacuum-generating apparatus is configured such as to provide vacuum at least at the vacuum drum unit, and the second vacuum-generating apparatus is configured such as to provide vacuum at least at the first vacuum cylinder. Inasmuch as both the vacuum drum as well as the at least one vacuum cylinder comprise in each case an independent vacuum-generating apparatus, these components and modules can be subjected specifically for the purpose and in a simple manner to vacuum conditions which are the same or different. It is possible in a particularly simple manner for an adjustment to be made to changing external circumstances, whether this be at a change of the label strip or also of a batch, by the allocation of a respective independent vacuum-generating apparatus to both the at least one vacuum cylinder as well as to the vacuum drum.

In particular, this allows each vacuum cylinder or the vacuum drum to be adjusted independently. Since according to the invention there are now quasi-independent vacuum-generating apparatus units present as separate units, the vacuum-generating units provided for the respective unit concerned are selected so as to be optimized, i.e. enhanced in meeting the particular requirement. For example, some vacuum consuming components, i.e. in particular the vacuum cylinder or the vacuum drum, require a comparatively large volume flow at low underpressure, while by contrast other vacuum consuming components require a substantial underpressure in comparison, while at the same time having a small volume flow. Due to the enhanced design of the vacuum-generating units, each individual vacuum-generating unit considered individually, but also all the vacuum-generating units considered as a whole, can be selected as much smaller, as a result of which the costs of procurement, and in any event the regular operating costs and/or energy costs, can be reduced. In addition to this, the expensive mechanical adjustment devices can be done away with, since the vacuum-generating units are designed to be electrically controlled and/or regulated.

Finally, this also reduces format change times are also reduced, since the regulating and adjustment parameters can be stored in a machine control unit in a format-dependent manner, and, in the event of a format change, they only need to be called up by the operating personnel from the machine control unit in order to be activated. In comparison, at the present time, in the prior art, all the mechanical adjustment fittings must be brought into the corresponding setting positions, which is time-consuming and therefore expensive.

According to one advantageous embodiment, provision is made for the first and second vacuum-generating apparatus units to be capable of being operated independently of one another and/or operated at a different underpressure level in each case.

According to a further advantageous embodiment, provision is made for the vacuum drum unit to comprise at least two vacuum containers, provided at the vacuum drum unit and offset about a drum perpendicular axis, and rotatable about the drum perpendicular axis, at which the separated individual labels are held by means of the vacuum.

According to another advantageous embodiment, provision is made for the first vacuum-generating apparatus unit, with the at least one drum unit, to form a first vacuum system, and the at least one vacuum cylinder, with the at least one second vacuum-generating apparatus unit, to form a second vacuum system.

According to another advantageous embodiment, provision is made for the first and second vacuum systems to be configured so as to be controlled and/or regulated independently of one another by means of a common control unit.

According to another advantageous embodiment, provision is made for the first vacuum system to comprise at least one pressure sensor and/or the second vacuum system to comprise at least one pressure sensor.

According to another advantageous embodiment, provision is made for the at least one vacuum cylinder of the first vacuum system to comprise at least one rotation angle sensor and/or for the at least one vacuum drum unit of the first vacuum system to comprise a rotation angle sensor.

According to another advantageous embodiment, provision is made for a processor unit provided in the control unit to be configured such as to determine actual control data from the rotation speed and/or the rotation direction and/or the rotation speed and/or the actual pressure value detected, in the at least one first and second vacuum system, in order, deriving from this data, to operate the first and/or second vacuum-generating apparatus with the required vacuum or suction capacity.

According to another advantageous embodiment, provision is made for the first and at least one second vacuum cylinder to be capable of being subjected to vacuum by a common second vacuum-generating apparatus in such a way that the first and the at least one second vacuum cylinder form the second vacuum system.

According to another advantageous embodiment, provision is made for the first and the at least one second vacuum cylinder to be capable in each case of being subjected to vacuum by a separate vacuum-generating apparatus in such a way that the first vacuum cylinder forms the second vacuum system and the at least one third vacuum cylinder forms a third vacuum system.

According to another advantageous embodiment, provision is made for the at least one first and/or second vacuum-generating apparatus to be configured as an electrically driven vacuum pump, wherein, in turn, for particular preference, side channel compressors or radial fans are used as the vacuum pump.

According to another advantageous embodiment, provision is made for the at least one first and/or second vacuum-generating apparatus to be configured as an electrically driven vacuum pump, in particular a side channel compressor.

According to another advantageous embodiment, provision is made for the at least one vacuum cylinder forms on its rotating outer lateral surface, depending on the rotation angle, at least one first vacuum region for imposing at least one first underpressure.

According to another advantageous embodiment, provision is made for the first vacuum region to be subjected to vacuum by the second vacuum-generating apparatus and the second vacuum region to be subjected to vacuum by a third vacuum-generating apparatus.

The expression "essentially" or "approximately" signifies in the meaning of the invention deviations from the exact value in each case by +/−10%, preferably by +/−5%, and/or deviations in the form of changes which are not of significance for the function.

Further embodiments, advantages, and possible applications of the invention also derive from the following description of exemplary embodiments and from the figures. In this situation, all the features described and/or pictorially represented are basically the object of the invention, alone or in any desired combination, regardless of their arrangement in the claims or reference to them. The contents of the claims are also deemed a constituent part of the description.

BRIEF DESCRIPTION OF THE DRAWINGS

These and other features of the invention will be apparent from the following descriptions and the accompanying figures, in which.

Identical reference numbers are used in the figures for elements of the invention that are the same or have the same effect. In addition, for the sake of easier overview, only reference numbers are represented in the individual figures that are necessary for the description of the respective figure.

DETAILED DESCRIPTION

Figure 1:
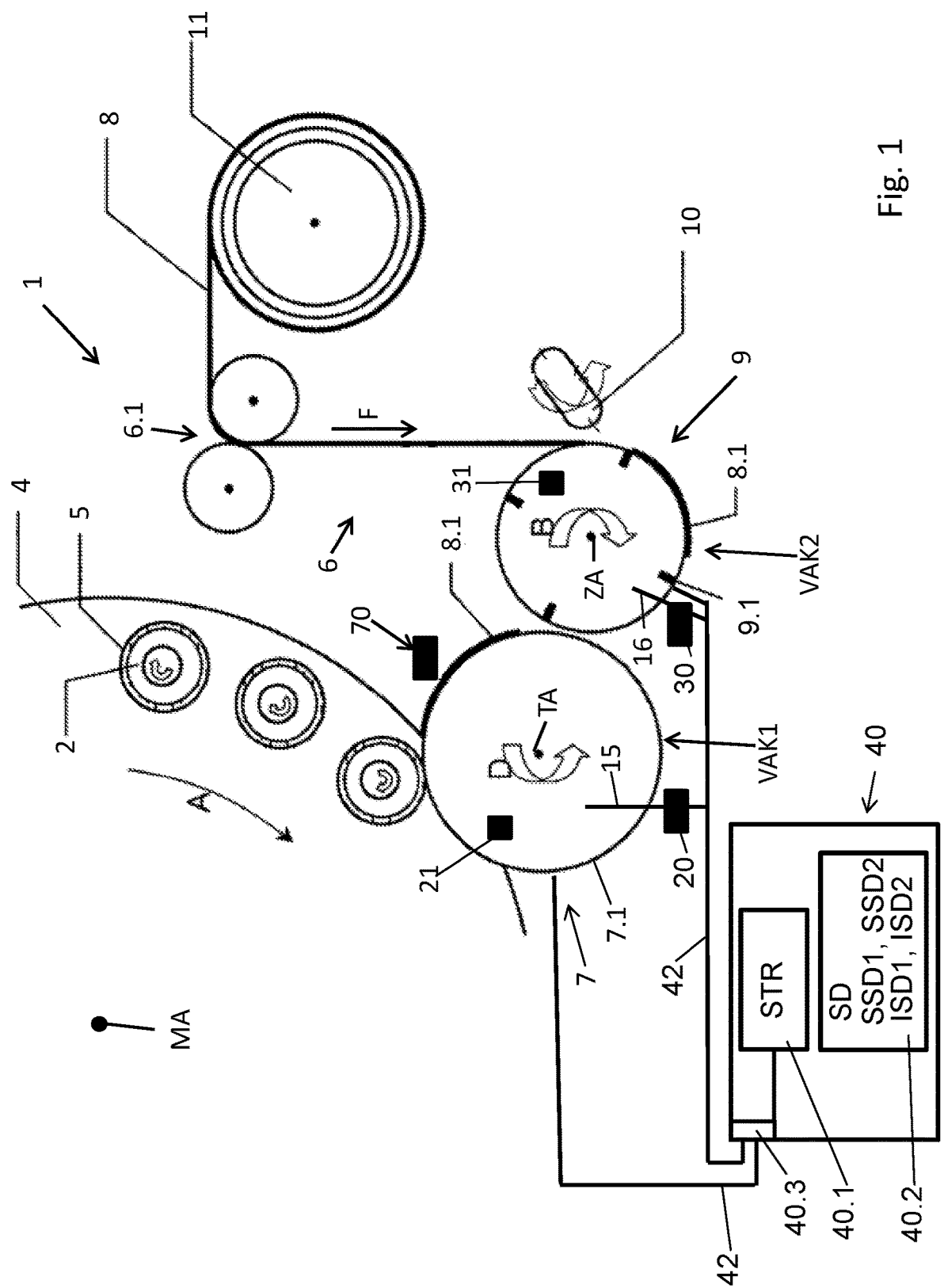
FIG. 1 is a block view of an exemplary embodiment of a device for labelling containers.

FIG. 1 shows a labeling machine 1 that labels containers 2, and in particular, bottles. The labeling machine 1 is disposed next to a rotor 4 that is driven to rotate about a vertical machine axis MA in a clockwise direction A as seen from above. The labeling machine 1 includes a label-strip feeder 6 and a vacuum drum 7. The label-strip feeder 6 feeds a label strip 8 that comprises individual labels 8.1.

The rotor 4 includes container carriers 5 around a circumference thereof. In the illustrated embodiment, the container carriers 5 are rotating plates. During labelling, containers 2 to be labeled are delivered to the rotor 4 via a container inlet. Containers that have been labeled are removed via a container outlet. A container 2 that is to be labeled stands upright on a rotating plate 5 that moves past the label-strip feeder 6. The label-strip feeder 6 remains stationary. It does not rotate with the rotor 4.

The label-strip feeder 6 further comprises a first vacuum cylinder 9 that rotates about a cylinder vertical axis ZA. A force caused by a vacuum holds a length of label strip 8 along part of an outer lateral surface 9.1 of the vacuum cylinder 9.

The label-strip feeder 6 also comprises at least one cutter for separating the label strip 8 into individual labels 8.1. Using its own vacuum, the vacuum drum 7 receives the individual labels 8.1 provided by the first vacuum cylinder 9, holds them at its own outer lateral surface 7.1, and transports them along a conveying direction F.

The label strip 8 runs continuously from a store 11, which in the illustrated embodiment, is a label strip roll. Arranged along the label strip 8 are individual labels 8.1 that are to be cut individually. These labels are arranged so that one follows the other with some interval between them, which in some cases can be an essentially zero interval.

The label-strip feeder 6 comprises a label-strip drive 6.1 through which the label strip 8 is guided. In one embodiment, the label-strip drive 6.1 takes the form of a pair of rollers that are arranged in counter-rotation and through which the label strip 8 is guided over the vacuum cylinder 9 as well as over the vacuum drum 7.

The label strip 8 comes into contact with the circumferential side of the vacuum cylinder 9 and loops around a portion of the vacuum cylinder 9 at a predetermined loop angle on its way to the vacuum drum 7 that follows.

The vacuum drum 7 rotates about a drum vertical axis TA that is parallel or essentially parallel to the vacuum cylinder's vertical axis ZA or to the machine axis MA. In the illustrated embodiment, the vacuum cylinder 9 rotates in a clockwise direction B while the vacuum drum 7 rotates in a counterclockwise direction D.

The transfer of the individual labels 8.1 from the vacuum cylinder 9 to the vacuum drum 7 takes place in such a way that the leading end of an individual label 8.1 that moves in the conveying direction F contacts the vacuum drum 7 before the trailing end of this individual label 8.1 is released from the vacuum cylinder 9.

Figure 2:
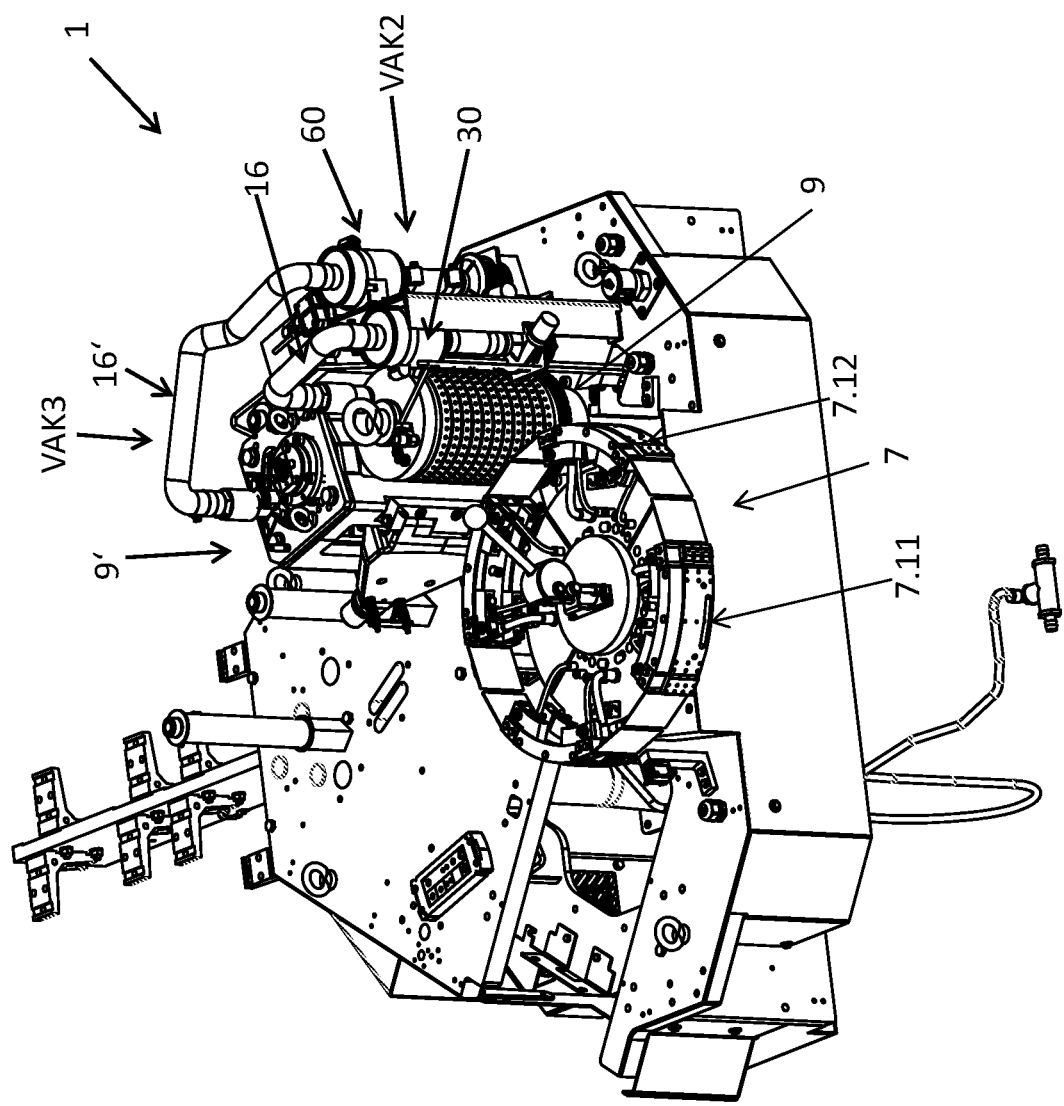
FIG. 2 is a perspective view of a further embodiment of a device for labelling containers.

As shown in FIG. 2, the outer lateral surface 7.1 of the vacuum drum 7 comprises two vacuum holders 7.11, 7.12, each of which occupies a corresponding segment of the vacuum drum 7. These vacuum holders 7.11, 7.12 are circumferentially offset from each other along the rotation direction D. Each vacuum holder 7.11, 7.12 has openings that are exposed to a vacuum or under-pressure.

Each vacuum holder 7.11, 7.12 accommodates an individual label 8.1. It does so in such a way that the individual label 8.1 comes into contact at its front side, which is the side that is visible after the label has been applied onto the container 2. An under-pressure at the openings holds the front side against the outer surface of the vacuum holder 7.11, 7.12.

The label-strip drive 6.1 of the label-strip feeder 6 causes the label strip 8 to leave the store 11 at a first speed V1, which can be different from a second and third speed V2, V3 at which the vacuum drum 7 and the vacuum cylinder 9 are respectively driven.

In some embodiments, the first speed V1 is less than the second and/or third speed V2, V3. In a preferred embodiment, the third speed V3 is greater than or equal to the second speed V2.

However, there exists a restraining force on the label strip 8. As a result, the label strip 8 is transported only at the speed V1 while the transport speeds of the vacuum cylinder 9 or of the vacuum drum 7 are greater than the feed speed by the label-strip drive 6.1. This places the label strip 8 under tension and also results in slippage. The slippage can be between the vacuum cylinder 9 and that portion of the label strip 8 that contacts the outer circumference side at the vacuum cylinder 9. The slippage can also be between that portion of the label strip 8 that contacts the vacuum drum 7.

By making an appropriate cut, the cutter 10 separates a desired length of the label strip 8 at an individual label 8.1. Immediately before the separation, a first portion of the length that is to be separated from the label strip 8 comes into contact at the outer lateral surface 9.1 of the vacuum cylinder 9 and a second portion of that length comes into contact with one of the vacuum holders 7.11, 7.12.

Once the separation of the label 8.1 from the label strip 8 has been completed, the restraining effect caused by the label-strip drive 6.1 ceases. This means that the label 8.1 can now be transported at a higher speed than the delivery speed of the label-strip drive 6.1. The label 8.1 will also be transported free of slippage on its way to a glue applicator 70 and then onto a device that actually applies the labels to containers 2 at the rotor 4.

The vacuum drum 7 and the vacuum cylinder 9 are configured to suck the section of the label strip 8 and/or of an individual label 8.1 that is in contact with it, i.e., that has come into contact with its respective outer lateral surface 7.1, 9.1. To do so, the vacuum drum 7 and the vacuum cylinder 9 are exposed to a vacuum. This arises from sucking air through the vacuum drum 7 and through openings provided at the vacuum cylinder 9 from an otherwise enclosed interior space. The vacuum results in the exertion of holding or fixing forces on the label strip 8 and/or on the individual labels 8.1. This fixes the label strip 8 and/or of the individual labels 8 against the vacuum drum 7 and the vacuum cylinder 9.

FIG. 1 shows first and second vacuum sources 20, 30. The first vacuum source 20 provides a vacuum to the vacuum drum 7. The second vacuum source 30 provides vacuum at the first vacuum cylinder 9. A connecting line 15 connects the first vacuum source 20 to the vacuum drum 7. The second vacuum source 30 connects by a connecting line 16, which can likewise be configured as a flexible pipe, to the first vacuum cylinder 9.

The vacuum drum 7, the connecting line 15, and the first vacuum source 20 define a first vacuum system VAK1. The vacuum cylinder 9, which connects via a connecting line 16 to the second vacuum-generating apparatus 30, defines a second vacuum system VAK2. The connecting lines 15, 16, as well as other connecting lines described herein, are fluid-tight connecting lines that, in some embodiments, are flexible pipes.

The first and second vacuum systems VAK1, VAK2 are autonomous systems that are driven independently of one another. As such, it is possible for them to maintain under-pressures that differ from each other.

A controller 40 actuates the first and second vacuum systems VAK1, VAK2 independently of each other. In some embodiments, the controller 40 is a machine control unit or a part of the machine control unit of the label feeder 1 or of a system comprising the label feeder 1. The controller 40 is common to both vacuum systems VAK1, VAK2.

The first and second vacuum systems VAK1, VAK2 each includes a corresponding pressure sensor 21, 31 for detecting the relative pressure prevailing in the respective first and/or second vacuum systems VAK1, VAK2, and, in particular, a prevailing under-pressure.

In some embodiments, the vacuum cylinder 9 and/or the vacuum drum 7 also comprises corresponding first and second rotation-angle sensors 22, 32, for the detection of the rotation speed and/or the direction of rotation of the vacuum cylinder 9 and/or of the vacuum drum 7. Among these embodiments are those in which the vacuum cylinder 9 of the second vacuum system VAK2 comprises the first rotation-angle sensor 32, and the vacuum drum 7 of the first vacuum system VAK1 comprises the second rotation-angle sensor 22.

In some embodiments, the controller control unit 40 further comprises a processor 40.1 and a memory 40.2 that interacts with the processor 40.1. The memory 40.2 stores control data SD that can be transferred and/or received by way of an interface 40.3 from the controller 40 via control lines 42 to the first and second vacuum systems VAK1, VAK2. In some embodiments, a control routine STR executing on the controller control unit 40 actuates the first and second vacuum systems VAK1, VAK2.

The control data SD includes data ISD1, ISD2 that has been detected in the first and second vacuum systems VAK1, VAK2. Examples of such data ISD1, ISD2 include the respective actual numbers of revolutions, the actual rotation directions for each of the corresponding vacuum systems VAK1, VAK2, the actual rotation speeds, and the actual pressure values, as well as the corresponding reference control data, such as, for example, a reference number of revolutions, a reference rotation direction, a reference rotation speed, and reference pressure values.

Figure 3:
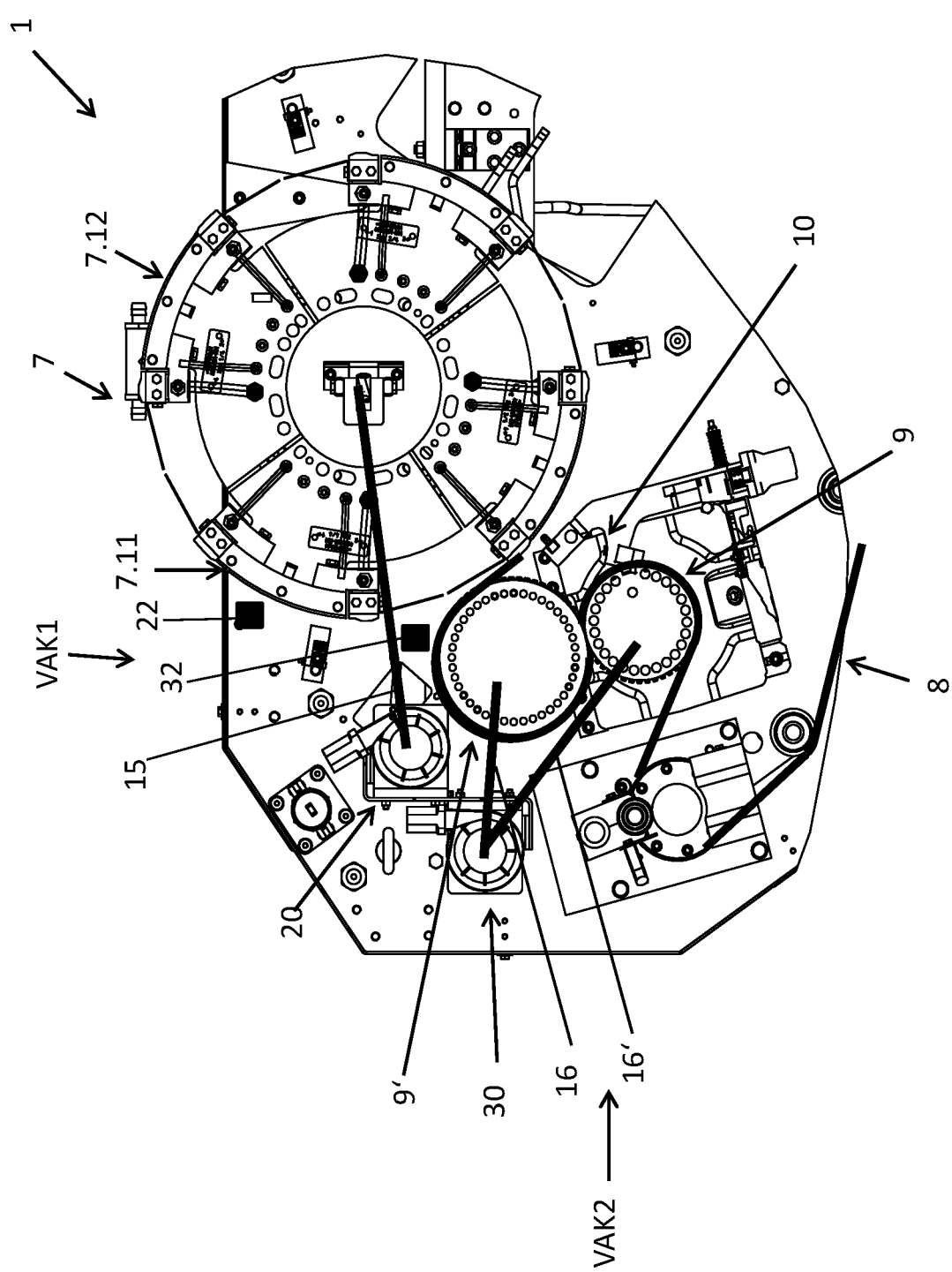
FIG. 3 is a view from above a device for labelling containers in accordance with the embodiment of FIG. 2.

Some embodiments, for example those shown in FIGS. 2 and 3, include additional vacuum cylinders 9' or vacuum sources 60. These components form a third vacuum system VAK3 for which a corresponding parameter set can then be defined in the same way. This holds true for any number of such vacuum systems.

In some embodiments, the processor 40.1 determines the actual control data ISD from some combination of measured parameters obtained from the first and second vacuum systems VAK1, VAK2. Examples include one or more of the number of revolutions, the rotation direction, the speed of rotation, and the prevailing vacuum or actual pressure value in the first and second vacuum system VAK1, VAK2. The processor 40.1 derives from this the required vacuum or suction capacity needed to operate either or both the first and second vacuum sources 20, 30 to impose an adequate vacuum on the first vacuum drum 7 or the first vacuum cylinder 9.

In some embodiments, the processor 40.1 compares actual control data ISD1, ISD2 received via the interface 40.3 with reference control data SSD1, SSD2. Based on the outcome of this comparison, the processor 40.1 generates control data SD for the control routine STR or defines control commands that are transferred to the corresponding first and second vacuum systems VAK1, VAK2. In other embodiments, the memory 40.2 stores pre-defined reference control data SSD for the first and/or second vacuum system VAK1, VAK2.

In yet other embodiments, the controller 40 stores, in the memory 40.2, different data sets SD for different label formats. Preferably, such data sets SD include reference pressure values SSD1, SSD2 for operating the first and/or second vacuum systems VAK1, VAK2.

Other embodiments provide the ability to manually cause the controller 40 to select a data set to be used as the control data SD before processing another type of label. This then makes it possible, without elaborate manual adjustment, to apply the correct pressure values to the first and/or second vacuum systems VAK1, VAK2.

FIGS. 2 and 3 show a labeling machine 1 with first and second vacuum cylinders 9, 9' and a vacuum drum 7. The first vacuum cylinder 9 has a diameter that is smaller than that of the second vacuum cylinder 9'. In these embodiments, the second vacuum cylinder 9' is configured as a transfer cylinder.

In the embodiment shown in FIG. 3, the second vacuum source 30 provides a vacuum for both the first and second vacuum cylinders 9, 9' and the first vacuum source 20 provides the vacuum for the vacuum drum 7. Connecting lines 16, 16' connect the second vacuum source 30 to corresponding first and second vacuum cylinders 9, 9' to form a common second vacuum system VAK2'. The first and second vacuum cylinders 9, 9' therefore interact with the second vacuum-generating apparatus unit 30, which is common to them, and so form a second vacuum system VAK2'. Meanwhile, the vacuum drum 7 and the first vacuum source 20 form the first vacuum system VAK1.

In an alternative embodiment, shown in FIG. 2, the first and second vacuum cylinders 9, 9' are subjected to vacuums from separate individual vacuum sources 30, 60 that provide vacuums at their corresponding first and second vacuum cylinders 9, 9'.

In this embodiment, the second vacuum source 30 can further be connected by way of the connecting lines 16 to the first vacuum cylinder 9, and the second vacuum system VAK2, while the third vacuum-generating apparatus unit 60 is connected via the connecting line 16' to the second vacuum cylinder 9', and therefore forms the third vacuum system VAK3.

Some embodiments implement the vacuum sources 20, 30, 60 as electrically driven vacuum pumps, such as side channel compressors. These embodiments regulate the vacuum capacity or suction capacity of the vacuum sources 20, 30, 60 by changing the number of revolutions per unit time at which the pump operates. A frequency-regulator controls electrical actuation of the drive motor associated with each of the vacuum sources 20, 30, 60. In either case, the controller 40 controls or regulates the vacuum sources 20, 30, 60.

Figure 4:
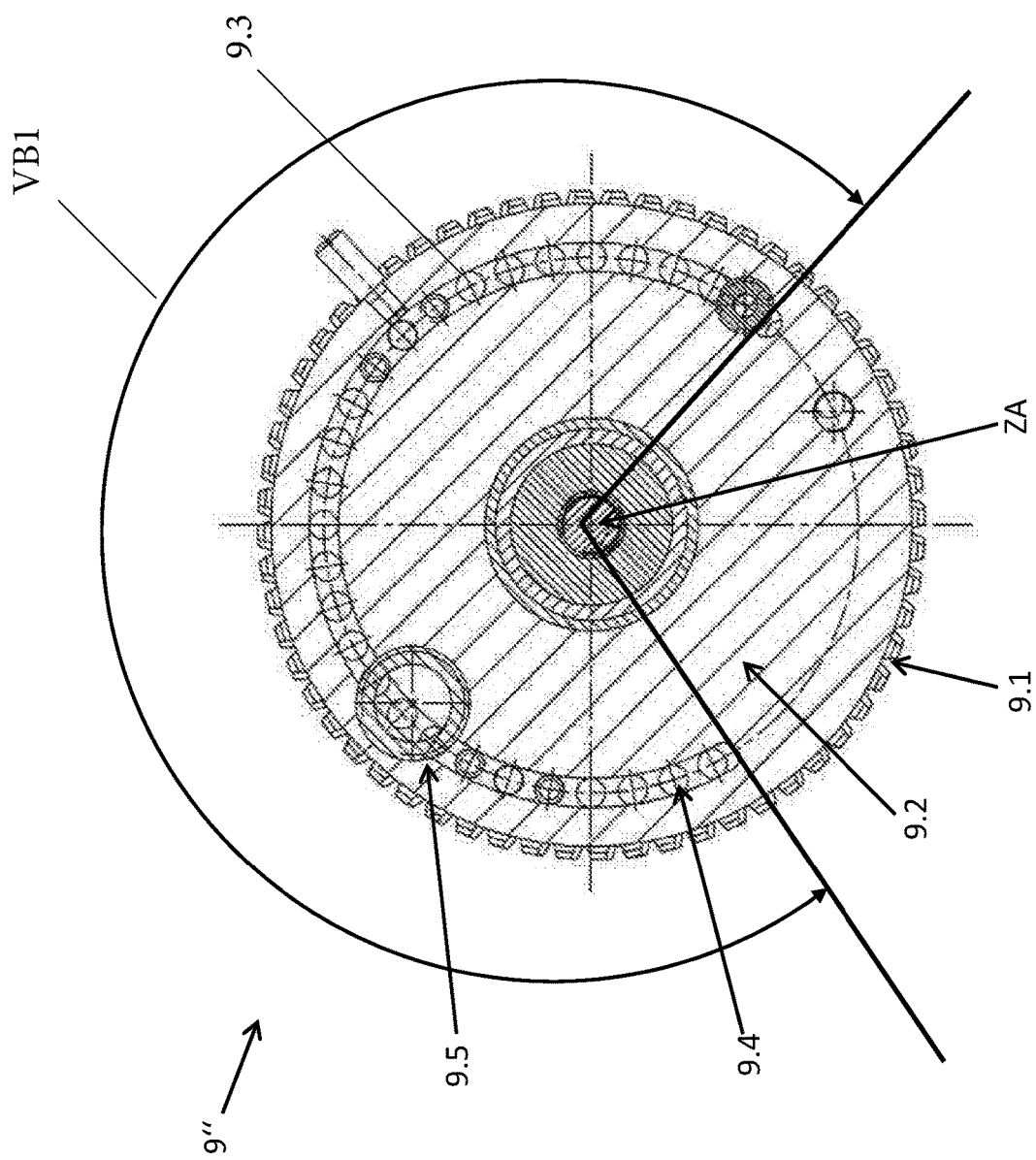
FIG. 4 is a schematic view from above an embodiment of a vacuum cylinder.
Figure 5:
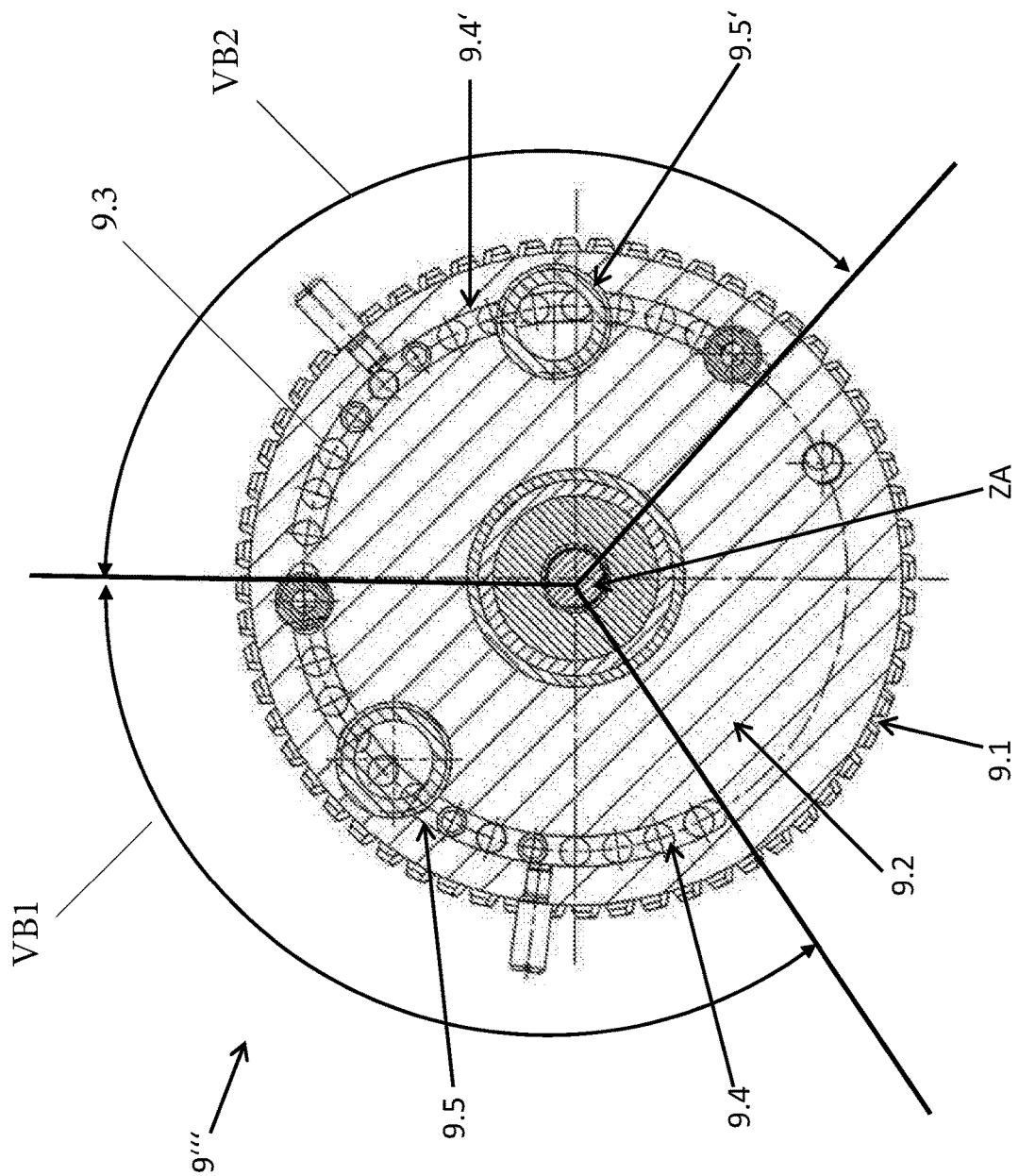
FIG. 5 is a view from above a further embodiment of a vacuum cylinder.

FIGS. 4 and 5 show views from above two embodiments of a vacuum cylinder 9", 9''' with differing numbers of vacuum regions. The vacuum cylinder 9" shown in FIG. 4 comprises only a first vacuum region VB1 whereas the vacuum cylinder 9''' shown in FIG. 5 has first and second vacuum regions VB1, VB2. Each vacuum cylinder 9", 9''' includes a stationary inner body 9.2 and an outer lateral surface 9.1, both of which are concentric with the cylinder's vertical axis ZA. The outer lateral surface rotates about the vertical axis ZA. The inner body 9.2 remains stationary.

Both cylinders 9', 9''' feature a common vacuum distribution channel 9.4 having openings. A connecting line 16, 16' connects the vacuum distribution channel 9.4, via a connection section 9.5, to a corresponding one of the first and second vacuum sources 20, 60. As a result, during rotation, the vacuum distribution channel provides a first underpressure P1 in the first vacuum region VB1.

In the embodiment shown in FIG. 5, the vacuum cylinder 9''' has first and second vacuum distribution channels 9.4, 9.4' with corresponding first and second connection sections 9.5, 9.5'. Depending on the rotational position, one or the other of the vacuum distribution channels 9.4, 9.4' will connect to openings 9.3 on the outer lateral surface 9.1. As a result, the first vacuum distribution channel system 9.4 forms the first vacuum region VB1 and the second vacuum distribution channel system 9.4' forms the second vacuum region VB2.

A common vacuum source 20, 60 connects via an intermediate connection provided by a connecting line 16, 16' to the first and second connecting sections 9.5, 9.5'. This creates a common first underpressure P1 at the first and second vacuum regions VB1, VB2 during rotational stroking movement over the openings 9.3 provided in the outer lateral surface 9.1 of both the first and second vacuum regions VB1, VB2.

In another embodiment, connecting lines 16 connect the first connection section 9.5 to the second vacuum source 30 to produce a first underpressure P1 and connecting lines 16' connect the second connection section 9.5' to the third vacuum source 60 to produce a second underpressure P2. As a result, the stroking movement caused by rotation past the openings 3.1 in the outer lateral surface 9.1 cause the first underpressure P1 in the first vacuum region VB1 and the second underpressure P2 in the second vacuum region VB2.

The invention has been described heretofore by way of exemplary embodiments. It is understood that numerous modifications and derivations are possible, without thereby departing from the inventive concept underlying the invention as set forth in the claims.

The invention claimed is:

1. An apparatus for labelling containers, said apparatus comprising a label-strip feeder configured to feed a label strip that comprises individual labels, a vacuum drum configured to receive said individual labels, and first and second vacuum sources, wherein said label-strip feeder comprises a cutter for separating said label strip into said individual labels and a vacuum cylinder that rotates about a vertical axis, said vacuum cylinder having an outer lateral surface against which, during operation, a length of said label strip is held by a vacuum at said vacuum cylinder, said outer lateral surface comprising a first vacuum region and a second vacuum region, said first and second vacuum regions being separated from each other, wherein, during operation, said first vacuum region provides a first underpressure and said second vacuum region provides a second underpressure that differs from said first underpressure, wherein said vacuum drum is configured to receive said individual labels from said vacuum cylinder, to hold said individual labels at an outer lateral surface thereof, and to transport said individual labels in a conveying direction by holding said labels with a force that results from exposing said labels to a vacuum at said vacuum drum, wherein said first vacuum source provides said vacuum at said vacuum drum and said second vacuum source provides said vacuum at said vacuum cylinder, and wherein said vacuum drum comprises vacuum holders at which said individual labels are held by said vacuum at said vacuum drum, said vacuum holders being offset about a vertical axis of said drum and being rotatable about said vertical axis of said drum.

2. The apparatus of claim 1, wherein said first and second vacuum sources are operable independently of one another.

3. The apparatus of claim 1, wherein said first vacuum source and said drum are constituents of a first vacuum system and wherein said vacuum cylinder and said second vacuum source are constituents of a second vacuum system.

4. The apparatus of claim 3, further comprising a controller that is common to both said first and second vacuum systems, said controller being configured to control said first and second vacuum systems independently of each other such that said first and second vacuum systems provide different under-pressures.

5. The apparatus of claim 3, further comprising first and second pressure sensors, wherein said first vacuum system comprises said first pressure sensor and said second vacuum system comprises said second pressure sensor.

6. The apparatus of claim 1, wherein said vacuum cylinder and said vacuum drum each comprise a rotation-angle sensor.

7. The apparatus of claim 4, wherein said controller comprises a processor configured to adjust vacuum capacity of said first and second vacuum sources in response to variations in operation of said first and second vacuum systems, wherein said variations in operation comprise at least one of variations in relative pressure prevailing in said first and/or second vacuum systems and variations in rotation speed and/or rotation direction of said vacuum cylinder and/or said vacuum drum.

8. The apparatus of claim 3, wherein said vacuum cylinder is a first vacuum cylinder from a plurality of vacuum cylinders, all of which are subjected to a vacuum provided by said second vacuum source, wherein said plurality of vacuum cylinders is a constituent of said second vacuum system.

9. The apparatus claim 1, wherein said first and second vacuum sources comprise side channel compressors.

10. The apparatus claim 1, wherein said first and second vacuum sources comprise electrically-driven vacuum pumps.

11. The apparatus of claim 1, wherein said second vacuum source provides a vacuum to said first vacuum region and a third vacuum source provides a vacuum to said second vacuum region.

* * * * *